Sept. 9, 1969     PING SUN CHUN     3,466,527
OVERLOAD PROTECTED SWITCHING REGULATOR
Filed Nov. 22, 1967     2 Sheets-Sheet 1

INVENTOR
P. S. CHUN
BY
ATTORNEY

United States Patent Office 3,466,527
Patented Sept. 9, 1969

3,466,527
OVERLOAD PROTECTED SWITCHING REGULATOR
Ping Sun Chun, Morris Township, Morris County, N.J., assignor to Bell Telephone Laboratories, Incorporated, Murray Hill and Berkeley Heights, N.J., a corporation of New York
Filed Nov. 22, 1967, Ser. No. 685,094
Int. Cl. H02m 1/18
U.S. Cl. 321—14                                  5 Claims

ABSTRACT OF THE DISCLOSURE

A transformer connected between a bilateral triode switch and a capacitive input load filter is chosen so as to operate close to the extremes of its BH characteristic at a bilateral triode switching or firing angle of 90°. In the event of an overload condition, the firing angle decreases to a value less than 90°, the transformer saturates, and the circuit overload protection device is activated. Overload protection is thus obtained without the need for additional components.

Background of the invention

This invention relates to voltage and current regulators and more particularly to switching regulators with overload protection.

A switching regulator obtains regulation by varying the conductive interval at which the switching element transmits energy from the input source to the load in accordance with load voltage variations. In a phase controlled switching regulator, the time or phase angle in an input half-sinusoid at which the switching element is biased into conduction is controlled. Thus for an increase in load voltage, the phase or firing angle is increased toward 180° and for a decrease in load voltage the firing angle is decreased toward 0°. The increase or decrease in the energy delivered from the input source to the load thereby compensates for the change in load voltage and regulation is achieved.

In these phase controlled switching regulators, a transformer is often employed between the switching element and the load or output filter to either step-up or down the switched source voltage. The output or load filter is invariably an inductive input filter which averages the output voltage waveform delivered from the switching element. The transformer normally chosen for the voltage step-up or down has a BH characteristic many times greater than the BH range over which the transformer operates to insure that the transformer is never saturated, i.e., never operates in a non-linear manner. With the usual inductive input load filter, this transformer must also have magnetic flux capabilities sufficient to handle the full half-cycle power (corresponding to a firing angle of close to 0°) transmitted in response to a substantial decrease in load voltage. These requirements significantly increase both the size and the cost of the transformer.

It is often desired in these switching regulator circuits to provide overload protection in the event of a condition such as a load short circuit, for example. Such protection usually requires a large number of additional circuit components which increase both the cost and the complexity of the circuit. The total cost of the transformer and the additional overload protection circuitry thus represents a considerable portion of the total cost of such a switching regulator.

It is, therefore, an object of this invention to provide a switching regulator wherein the cost of the transformer is reduced to a minimal amount and overload protection is provided without the need for additional circuit components.

Summary

In the present invention, the transformer between the switching element and the capacitive input load filter is chosen to operate relatively close to the extremes of its BH characteristic to obtain overload protection without the need for additional circuit components. Since a capacitive input filter, which delivers the peak value of the voltage from the switching element rather than the average value which an inductive input filter delivers, is employed, a full range of output voltages are obtained at firing angles between 90° and 180°. Under normal conditions, a 90° firing angle thus corresponds to both the maximum output voltage and the limits of the BH range over which the transformer can operate in a linear manner, i.e., without being driven into saturation. In the event of an overload condition, the feedback or firing angle control circuitry inherently reduces the firing angle of the switching element to a value less than 90°, thus increasing the half-cycle volt-time integral delivered from the input source via the switching element to the transformer, driving the transformer into saturation. Once the transformer saturates, its impedance suddenly drops and a surge of current is drawn from the input source. The surge of current activates the circuit protection device, which may be a fuse, and disconnects the circuit from the input source to protect the circuit. Overload protection is thereby obtained without the need for additional circuit components. It should also be noted that since the transformer need normally only have magnetic flux capabilities corresponding to the quarter cycle volt-time integral transmitted at firing angles between 90° and 180°, rather than the half-cycle volt-time integral corresponding to firing angles of 0° to 180° of the inductive input load filters normally employed in the prior art, the size and cost of the transformer may therefore be substantially reduced.

Brief description of the drawings

Other objects and features of the present invention will readily be apparent from the following discussion and drawings in which.

Detailed description

Figure 1:
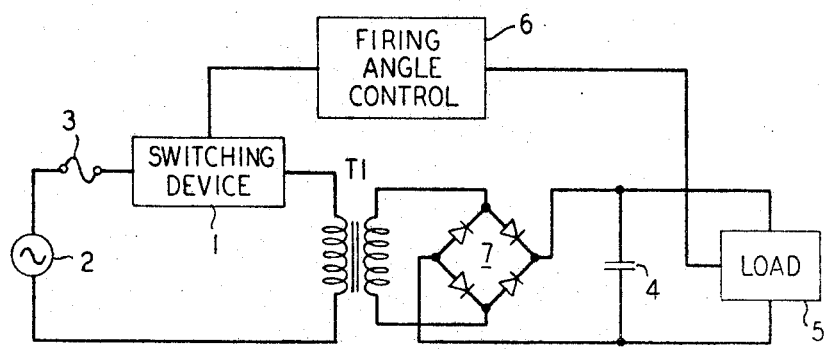
FIG. 1 is a block diagram embodiment of the invention.

As can be seen from FIG. 1 of the drawing, the switching or regulating device 1 is serially connected with the input A.C. source 2, the circuit protection device 3, and the primary winding of transformer T1. The input terminals of bridge rectifier 7 are connected to the secondary winding of transformer T1. Capacitive output filter 4 is connected across the output terminals of bridge rectifier 7 as is the load 5. The feedback firing angle control network 6, which controls the point or firing angle in each input half cycle of the A.C. source 2 at which conduction through the switching device 1 is initiated, is connected between the switching device 1 and the load 4.

Figure 2:
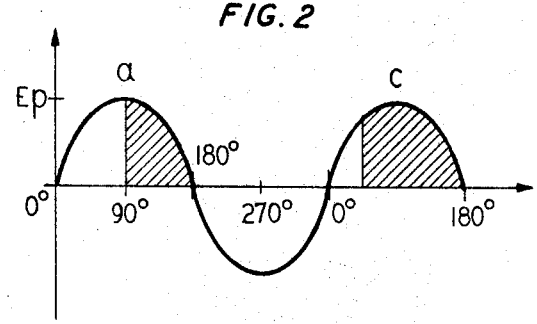
FIG. 2 is a sinusoidal waveshape useful in describing the present invention.
Figure 3:
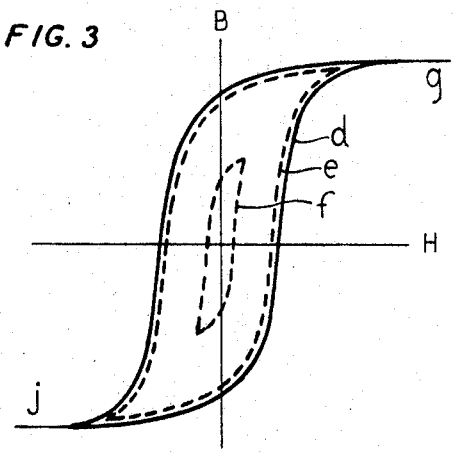
FIG. 3 is a transformer BH characteristic also useful in describing the present invention.

The manner in which the circuit of FIG. 1 obtains overload protection can best be explained by referring to FIGS. 2 and 3. The sinusoid of FIG. 2 corresponds to the output of the A.C. source 2. Since a capacitive filter 4 is employed across the secondary winding of transformer T1, the load potential may vary between zero and the peak voltage designated as $E_p$ in the sinusoidal waveshape of FIG. 2. If for purposes of illustration, it is assumed that transformer T1 has a 1 to 1 turns ratio, then a load voltage output having a magnitude $E_p$ will be obtained when the phase or firing angle is 90° and a zero output will correspond to a firing angle of 180°. An entire range of output voltages will thus be obtained at firing angles between 90° and 180°. The shaded areas of the positive half-sinusoids a and c of FIG. 2 illustrate respectively the maximum normal voltage output and an overload condition output in terms of the half-cycle volt-time integral transmitted by the switching device 1 to the transformer T1 from the input source 2. An overload condition, such as a load short circuit, causes the load voltage to drop. The phase angle control circuit 6, which is responsive to load voltage variations so as to vary the firing angle at which the switching device becomes conductive, characteristically attempts to compensate for this decrease in load voltage by decreasing the firing angle to a value less than 90°. The increased half-cycle volt-time integral which might be delivered from the output of A.C. source 2 to the primary winding of transformer T1 via the switching device 1 in response to an overload condition is illustrated by the positive half sinusoid c of FIG. 2. A short circuited load would, of course, cause virtually the whole half-sinusoid c to be transmitted to the primary winding of transformer T1.

The present invention obtains overload protection with the aforenoted combination of parameters and the proper selection of the BH operating range of linear transformer T1. The solid BH characteristic d of FIG. 3 is a typical characteristic of a transformer having a core such as iron. To insure that the transformer never saturates, a transformer such as T1 would normally be chosen so that the BH operating range was well within the essentially linear region of the BH characteristic of its core. A typical BH operating range which would normally be chosen is shown dotted as BH curve f in FIG. 3. Although such wasted transformer capability inherently implies increased transformer cost, this liability was accepted as the cost of prudent circuit design. The present invention utilizes the full BH capabilities of the transformer and, in addition to a straightforward savings in the cost of the transformer also incorporates this full utilization into an inexpensive and reliable method of overload protection.

The dotted BH characteristic e of FIG. 3 illustrates the BH operating range of the transformer T1 of the circuit of FIG. 1 when the switching device is being switched at a firing angle of approximately 90°. As discussed heretofore, a 90° firing angle represents maximum output voltage $E_p$ across the load 5 in the normal range of operation. As also noted heretofore in connection with the positive half-sinusoid c of FIG. 2, an overload condition will cause the firing angle at which the device 1 is switched to be less than 90° and thus cause a greater portion of input A.C. source half-sinusoid volt-time integral to be delivered to the primary winding of transformer T1. Since a 90° phase angle represents the maximum load voltage, decreasing the firing angle does not increase the load voltage. The firing angle control network, however, intrinsically continues to decrease the firing angle in an attempt to increase the load voltage. The firing angle thus approaches 0° rapidly in a regenerative manner and causes the BH operating range of transformer T1 to shift into either the g or j regions of the core BH characteristic shown on FIG. 3, and the transformer, which normally operates in the linear range, is now saturated. The regenerative manner in which the firing angle is reduced assures positive saturation of transformer T1 and positive action of the circuit protection device. Reliable overload protection is thereby obtained even in the event of conditions such as low input source 2 voltages, improper manufacture of transformer T1 with too many primary turns on the wrong core, and variations in the core material saturation flux density.

Once the transformer T1 saturates, the impedance it presents to the input source 2 abruptly decreases and thereby causes a surge of greatly increased current to be drawn from the source 2. This surge of increased current operates or opens the circuit protection device 3 which, as illustrated in FIG. 1, may be a fuse, and removes the input source 2 from the circuit. Since the input source of energy is removed from the circuit, the circuit is overload protected. It should be noted that protection is obtained without the need for a large number of additional components and, in fact, with just the components normally employed in such a circuit at a savings in the transformer cost.

Figure 4:
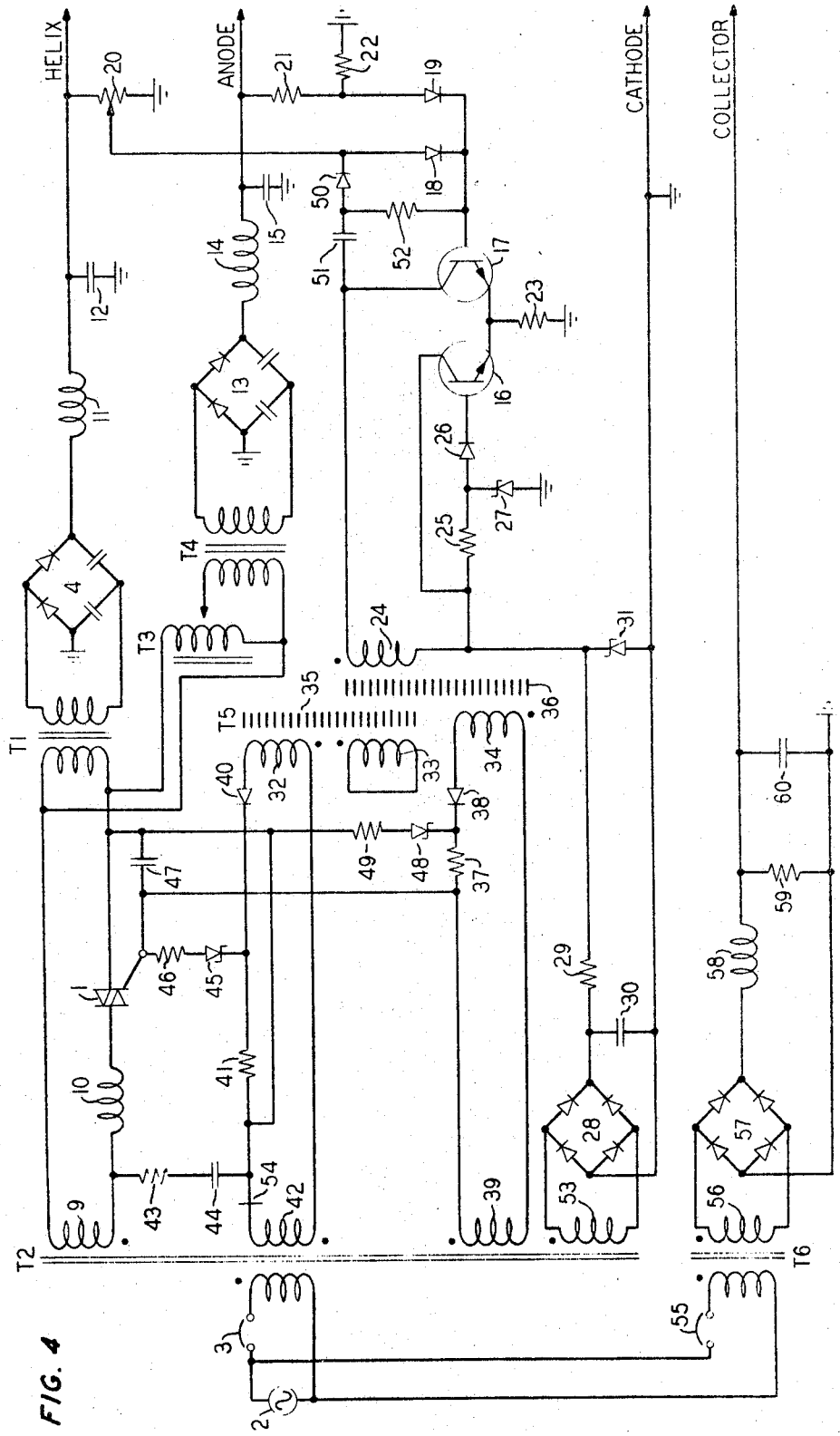
FIG. 4 is a schematic diagram of a circuit embodying the present invention.

FIG. 4 illustrates one such circuit in which the present invention may be employed. The circuit of FIG. 4 is a traveling wave tube power supply which supplies three distinct potentials measured with respect to a cathode electrode, to the helix, anode, and collector electrodes of a traveling wave tube. In the circuit of FIG. 4, the primary winding of transformer T2 is serially connected with the circuit protection device 3 to the input A.C. source 2. Winding 9 of the transformer T2 is serially connected with saturable inductor 10, the switching device 1, and the primary winding of transformer T1. Saturable inductor 10 will preferably have a high $\mu$ low squareness ratio core of a material such as powdered iron or dust. A core with this characteristic has been found to permit only a relatively slow build-up of current in the series loop, thereby considerably reducing the noise generated by the usual fast current build-up.

Switching device 1 as illustrated in FIG. 4 is a three-terminal bilateral triode switch which is capable of passing current in either direction in response to the application of a relatively low current, low voltage pulse between its gate and cathode terminals. Such a switch is described in detail at pages 142 through 148, 245, and 279 of the text "Semiconductor Controlled Rectifiers: Principles and Applications of p-n-p-n Devices" by F. E. Gentry et al., copyright 1964. It should be obvious, however, that the circuit of FIG. 4 is not restricted to such a device; that any equivalent device or combination of devices could be directly substituted therefor, for example, a pair of silicon controlled rectifiers connected in inverse-parallel with their gate leads interconnected.

The secondary winding of transformer T1 is connected to the input terminals of bridge capacitor-diode voltage doubler and filter 4 which doubles the A.C. voltage appearing across the secondary winding of transformer T1. In a traveling wave tube power supply, transformer T1 will normally step-up the voltage appearing at its primary winding, and the voltage doubling network 4 will step-up the voltage still further. The advantages of the use of the voltage doubler filter 4 are thus two-fold; first, the transformer ratio of transformer T1 need only be one-half that necessary with a conventional filter, and, secondly, since the doubler 4 responds to peak voltage, the switching device is normally gated into conduction at phase angles between 90° and 180° in each half cycle, reducing substantially the average A.C. voltage appearing across transformer T1. Both advantages result in reduced transformer size, weight, and cost and, as discussed heretofore, inherently provide overload protection. Filter inductor 11 is serially connected with the output terminals of doubler-filter 4 and the helix electrode of the traveling wave tube being supplied. Filter capacitor 12 is connected from the helix electrode of the tube being supplied to ground.

In the traveling wave tube anode supply, autotransformer T3 has its input terminals connected across the primary winding of transformer T1 and its output terminals connected to the primary winding of transformer T4. The bilateral switch 1 thus controls the voltage delivered to the anode electrode of the traveling wave tube as well as the voltage delivered to the helix electrode. The anode voltage may be adjusted by varying the tap on autotransformer T3. The secondary winding of transformer T4 is connected to the input terminals of a bridge voltage doubler-filter 13, the output terminals of which are serially connected with filter inductor 14 to the anode electrode of the traveling wave tube being supplied. Filter capacitor 15 is connected from the anode electrode of the tube being supplied to ground. Both the helix supply and the anode supply circuits thus present a transformer-capacitive voltage doubler-filter to the bilateral switch 1. The advantages obtained thereby are noted heretofore.

The firing angle control network of the bilateral switch 1 comprises transistors 16 and 17, saturable transformer T5, and the diode 18–19 exclusive OR gate. A predetermined portion of the helix-cathode voltage is sampled by the wiper arm of potentiometer 20, the end treminals of which are connected across the helix-cathode output terminals. Resistors 21 and 22 are serially connected across the anode-cathode output treminals while the wiper arm of potentiometer 20 is serially connected with exclusive OR gate diode 18 to the base electrode of differential amplifier transistor 17. The junction of resistors 21 and 22 is serially connected through exclusive OR gate diode 19 to the base electrodes of differential amplifier transistor 17. The emitter electrodes of differential amplifier transistors 16 and 17 are each connected to ground through common emitter resistor 23 in typical differential amplifier fashion. The collector electrode of transistor 17 is connected to one end terminal of winding 24 of saturable transformer T5 while the collector electrode of transistor 16 is connected to the other end terminal of this winding. Current limiting resistor 25 is serially connected with diode 26, in the forward conduction direction, between the collector and base electrodes of transistor 16. Reference voltage Zener diode 27 is connected in the Zener or reverse direction from the junction of resistor 25 and diode 26 to ground. Capacitor 51 and resistor 52 are serially connected with the base and collector electrodes of transistor 17 and form a loop-stabilizing compensation network. Diode 50 is connected in the forward conductivity direction from the junction of capacitor 51 and resistor 52 to the wiper arm of potentiometer 20 to allow capacitor 51 to charge quickly once the input source 2 is applied to the circuit, thereby activating the error detecting circuitry and starting the regulator.

The secondary winding 53 of transformer T2 is connected to a full-wave bridge rectifier 28, one output terminal of which is serially connected with current limiting resistor 29 to the junction of winding 24 and resistor 25. The remaining output terminal of bridge rectifier 28 is connected to ground. Filter capacitor 30 is connected across the output terminals of bridge rectifier 28. Zener diode 31 is connected in the Zener direction from the junction of current limiting resistor 29 and winding 24 to ground.

The primary winding of transformer T6 is serially connected with a circuit protection device 55 to the input A.C. source 2. Circuit protection device 3 and circuit protection device 55 are mechanically linked (companion trip) so that a fault current in either device will trip both devices. The secondary winding 56 of the transformer T6 is connected to a full-wave bridge rectifier 57, one output terminal of which is connected to ground. Filter inductor 58 is connected between the remaining output terminal of bridge rectifier 57 and the collector electrode of the traveling wave tube being supplied. Parallel connected resistor 59 and capacitor 60 are connected between the collector electrode of the tube being supplied and ground.

The circuit which delivers the firing signals to the bilateral switch 1 comprises windings 32, 33, and 34 of saturable transformer T5. Winding 33 is short-circuited to provide frequency compensation. Gate winding 32 is wound on one core 35, and gate winding 34 is wound on a second core 36. Windings 24 and 33 are wound on both cores 35 and 36. Resistor 37 and diode 38 are serially connected with gate winding 34 of saturable transformer T5 and gate drive winding 39 of transformer T2.

Safety interlock contact 54, resistor 41, and diode 40 are serially connected with gate winding 32 of saturable transformer T5 and gate drive winding 42 of transformer T2. Resistors 37 and 41 provide exciting current paths for the gate windings of transformer T5 while diodes 38 and 40 are poled to provide half cycle-blocking on an alternate basis, as discussed hereinafter. Safety interlock contact 54 provides protection for the technician working on the high voltage portions of the supply. When the protective covering surrounding these portions is removed, the normally closed contact 54 opens and the firing angle control circuit operates on a half cycle basis, as discussed hereinafter. The circuit then provides protection in two ways: first, the decreased volt-time integral delivered to the load initiates the overload protection process discussed heretofore and, secondly, the BH operating point of the transformer, which no longer has a signal to symmetrically drive it in the other direction on its BH characteristic, will increase in one direction and quickly saturate the cores of transformers T1 and T4. Once the cores saturate, protection is achieved in the manner discussed.

Resistor 43 and capacitor 44 are serially connected from the juncture of winding 9 and saturable inductor 10 to the juncture of resistor 41 and safety interlock contact 54 to prevent transients from inadvertently triggering the bilateral switch 1. Zener diode 45 is serially connected in the Zener direction with current limiting resistor 46 from the juncture of resistor 41 and diode 40 to the gate electrode of the bilateral switch 1. Capacitor 47 is connected across the gate and cathode electrodes of bilateral switch 1 to filter noise spikes from appearing across the gate-cathode electrodes of the bilateral switch especially those which might otherwise falsely trigger the bilateral switch into conduction. Zener diode 48 is serially connected in the Zener or reverse direction with current limiting resistor 49 from the juncture of resistor 37 and diode 38 to the cathode of the bilateral switch 1.

Diodes 18 and 19, the outputs of which are fed to an input of the differential amplifier transistor 17, form an exclusive OR gate. The gate is an exclusive OR gate since the output from the gate is present in response to one or the other of the inputs as opposed to a conventional OR gate where the output is present in response to one or both of the inputs. For normal operating conditions in the circuit of FIG. 4, for example, the potentials at the anode electrodes of diodes 18 and 19 are predetermined so that diode 18 will be forward biased and apply a potential to the cathode electrode of diode 19 to reverse bias this diode which is therefore nonconductive. The firing angle control loop is now controlled through the helix supply circuitry and the firing angle of the switching element is varied accordingly. If the voltage at the anode supply output should exceed a predetermined magnitude, however, the potential at the anode electrode of diode 19 would exceed the potential at its cathode electrode and this diode would now be biased into conduction in the forward conductivity direction. The higher potential at the cathode electrode of diode 19 back biases the cathode electrode of diode 18 and this diode becomes nonconductive. The firing angle control loop is now closed through the anode supply circuitry and the firing angle of the switching element is varied in accordance with variations of the anode voltage in the same manner as it was varied for variations in helix voltage. The control heretofore exercised by the helix circuitry on the firing angle is removed by the cessation of conductivity through the diode 18. The circuit thus transfers from regulation under the control of one feedback loop to regulation under control of a second feedback loop smoothly and without interaction between the feedback loops. Voltage limiting may thus be obtained.

Under normal conditions, i.e., when the helix electrode is controlling the firing angle at which the bilateral switch 1 conducts, diode 18 is forward biased as is diode 26, the forward voltage drop across each of the diodes is essentially equal. The base-emitter paths of both of differential amplifier transistors 16 and 17 are also forward biased so that both transistors are conductive. Zener diode 27 is constantly conductive in the reverse or Zener direction to provide a reference voltage at the base electrode of differential amplifier transistor 16. Since the emitter electrodes of both transistors are tied to ground by common resistor 23, the potential above ground of the emitter electrodes is determined by the sum of the currents leaving both emitter electrodes. The base electrode of transistor 16 is essentially clamped to the reference voltage provided by Zener diode 27, hence the potential at the emitter electrode remains fixed at essentially the reference voltage of Zener diode 27. The potential at the wiper arm of helix voltage sensing potentiometer 20, which is connected through forward biased diode 18 to the base electrode of transistor 17, must therefore also be essentially that of the reference voltage. If the helix voltage were to suddenly rise, however, the potential at the base electrode of transistor 17 would also rise and, since its emitter potential is essentially that of the reference voltage, its collector current must also rise at the magnitude of the base current change multiplied by the gain of the differential amplifier. The current flowing through the winding 24 of saturable transformer T5 thus increases and sets up an increased flux in cores 35 and 36 which opposes the flux set up in each core by the half-cycle currents from the gate drive windings 39 and 42, thereby causing both cores 35 and 36 to saturate at a point later in the input half-cycle from the source 2 and increasing the firing angle at which the bilateral switch 1 is switched into conduction. As discussed heretofore, increasing the firing angle at which the bilateral switch is triggered into conduction decreases the amount of energy transmitted from the input source to the load and thereby compensates for the assumed rise in helix-cathode voltage.

The manner in which saturable transformer T5 initiates conduction through the bilateral switch 1 is as follows: positive half-sinusoids induced by the input A.C. source 2 into winding 42 of transformer T2 forward bias diode 40, and cause exciting current to flow in the loop comprising winding 32 of transformer T5, diode 40, and resistor 41. As the magnitude of the half-sinusoid rises, the core 35 of transformer T5 approaches saturation. The exact point in time at which the core saturates is determined by the core bias established by the current flow through winding 24 which in turn is determined by the differential amplifier error detector comprising transistors 16 and 17 as discussed heretofore. Once the core 35 saturates, the impedance presented by winding 32 suddenly decreases and a surge of current flows through the loop comprising diode 40, resistor 41, and windings 32 and 42. This increase in current is accompanied by an increase in the voltage drop across resistor 41 which then causes Zener diode 45 to become conductive in the Zener direction and thereby provide a gating current sufficient to initiate conduction through bilateral switch 1. On the succeeding input negative half-sinusoid, the core 36 saturates at a point controlled by the current through winding 24, Zener diode 48 is conductive in the reverse direction, and the bilateral switch 1 is biased into conduction such that the current through the bilateral switch is now in a direction opposite to the direction in which current flowed in the previous input half-sinusoid.

The current induced in winding 9 from the source 2 thus flows through the primary winding of transformer T1 for portions of both the positive and negative half-sinusoids of the input source 2 as determined by the variations in the helix voltage. The transformer T1 in turn steps up the voltage thus transmitted which is then doubled by the voltage doubler 4. Winding 53 and full-wave rectifier 28, resistor 29, capacitor 30, and Zener diode 31 provide quiescent bias for the saturable transformer T5. Transformer T6, full-wave rectifier 57, filter inductor 58, bleeder resistor 59, and filter capacitor 60 comprise the traveling wave tube collector supply.

The circuit of FIG. 4 obtains overload protection in the manner discussed in connection with the circuit of FIG. 1. If the helix voltage were to drop due to an overload condition, the potential at the base electrode of differential amplifier transistor 17 would also drop. Since the potential at the emitter electrode of transistor 17 is essentially that of the reference voltage across Zener diode 27, as discussed heretofore, the collector current of transistor 17 will be sharply decreased. A decrease in the collector current of transistor 17 decreases the opposing flux set-up by winding 24 in cores 35 and 36 and causes the phase angle at which a firing or triggering signal is delivered to the bilateral switch to decrease to a value less than 90°. As discussed heretofore, transformer T1 is saturated by the excessive half-cycle volt-time integral transmitted from the input source at firing angles less than 90°, causing the impedance presented to the input source 2 to drop abruptly, drawing a surge of current, and activating the circuit protection device 3 which, as illustrated in FIG. 4, may be a circuit breaker.

It should be obvious that although a magnetic amplifier type of firing angle control circuit is employed in the circuit of FIG. 4, any of a large number of firing angles or phase control circuits well known to the art could be substituted therefor without departing from the spirit and scope of the invention.

The above-described arrangement is illustrative of the application of the principles of the invention. Other embodiments may be devised by those skilled in the art without departing from the spirit and scope thereof.

What is claimed is:

1. A switching regulator protected against an overload condition comprising an input pulsating source, a circuit protection device, a transformer having primary and secondary windings, a switching element, means serially connecting said input source, said circuit protection device, said switching element, and said primary winding, a load connected to said secondary winding, feedback means connected between said load and said switching element to determine the phase angle in each pulsation of the input source at which said switching element assumes the conductive state, and a capacitive input filter connected across said secondary winding to obtain a full range of load voltages at phase angles between 90° and 180° of each pulsation of the input source, said transformer being normally unsaturated for phase angles between 90° and 180° and saturated at phase angles less than 90° so as to draw a surge of current from said input source sufficient to operate said circuit protection device and obtain overload protection.

2. A switching regulator protected against an overload condition in accordance with claim 1 wherein a saturable inductor having a core with a low squareness ratio is serially connected with said input source, said circuit protection device, said switching element, and said primary winding to reduce the noise in the loop comprising said input source, said circuit protection device, said switching element, and said primary winding.

3. A switching regulator protected against an overload condition in accordance with claim 1 wherein said capacitive filter is a voltage doubler having first and second capacitors and first and second diodes connected in a bridge configuration having a pair of input and a pair of output terminals, one of said input terminals being formed by the interconnection of the cathode electrode of said first diode and the anode electrode of said second diode, the other of said input terminals being formed by the interconnection of one terminal of each of said first and second capacitors, one of said output terminals being formed by the connection of the anode electrode of said first diode and the remaining terminal of said first capacitor, the other of said output terminals being formed by the connection of the cathode electrode of said second diode and the remaining terminal of said second capacitor, said input terminals being connected to said secondary winding of said transformer, said output terminal being connected to said load.

4. A switching regulator protected against an overload condition in accordance with claim 1 wherein said switching element is a bilateral triode switch having first, second, and gate electrodes, said first and second electrodes being serially connected with said input source, said circuit protection device, and said primary winding, said gate electrode being connected to said feedback means.

5. A switching regulator protected against an overload condition comprising an input pulsating source, a circuit protection device, first and second transformers each having a primary and a secondary winding, a switching element, means serially connecting said input pulsating source, said circuit protection device, said switching element, and the primary winding of said first transformer, means connecting the primary winding of said second transformer across the primary winding of said first transformer, first and second loads connected respectively across the secondary winding of said first and second transformers, feedback means connected with said switching element to determine the firing angle in each pulsation of the input source at which said switching element assumes the conductive state, first and second capacitive filters connected across the secondary winding of each of said first and second transformers to obtain a full range of load voltages at phase angles between 90° and 180° of each pulsation of the input source, said first and second transformers being normally unsaturated for phase angles between 90° and 180° and saturated at phase angles less than 90° so as to draw a surge of current from said input source sufficient to operate said circuit protection device in the event of an overload condition, an OR gate having first and second input terminals and an output terminal, means connecting said first and second OR gate inputs to be responsive to at least a portion of the voltage appearing across said first and second loads respectively, and means connected to the output terminal of said OR gate to said feedback means to control the firing angle at which said switching means is conductive in accordance with the voltage variations across said first load when the voltage across said second load is below a predetermined magnitude and to control the firing angle in accordance with voltage variations across said second load when the potential across said second load is above said predetermined magnitude, whereby the voltage across said second load is prevented from exceeding said predetermined magnitude.

References Cited

UNITED STATES PATENTS

| | | | |
|---|---|---|---|
| 2,189,606 | 2/1940 | King | 323—62 |
| 3,215,895 | 11/1965 | Lach | 317—14 |
| 3,401,272 | 9/1968 | Rosa et al. | 323—62 X |

JOHN F. COUCH, Primary Examiner

J. D. TRAMMELL, Assistant Examiner

U.S. Cl. X.R.

317—33, 40; 321—15, 18; 323—22, 24, 62, 89